United States Patent [19]

Midland et al.

[11] Patent Number: 5,041,764
[45] Date of Patent: Aug. 20, 1991

[54] HORIZONTAL MISCONVERGENCE CORRECTION SYSTEM FOR COLOR VIDEO DISPLAY

[75] Inventors: Richard W. Midland, Inverness; Boris Rozansky, Buffalo Grove, both of Ill.

[73] Assignee: Zenith Electronics Corporation, Glenview, Ill.

[21] Appl. No.: 602,552

[22] Filed: Oct. 22, 1990

[51] Int. Cl.⁵ .......................... H01J 29/70; H01J 29/76
[52] U.S. Cl. ................................................ 315/368 R
[58] Field of Search .................... 315/368, 370, 371

[56] References Cited

U.S. PATENT DOCUMENTS

| | | |
|---|---|---|
| 4,342,029 | 7/1982 | Hofmanis et al. . |
| 4,401,922 | 8/1983 | Kamata et al. . |
| 4,408,223 | 10/1983 | Midland . |
| 4,415,889 | 11/1983 | Davis . |
| 4,422,019 | 12/1983 | Meyer . |
| 4,463,288 | 7/1984 | Judd . |
| 4,673,986 | 6/1987 | Jenness ........................... 315/382 |
| 4,687,973 | 8/1987 | Holmes et al. . |
| 4,689,526 | 8/1987 | Schweer . |

Primary Examiner—Theodore M. Blum

[57] ABSTRACT

A method for use in a raster-scanned electron beam display for displaying an image signal. The image signal is clocked out of a store at a variable clock rate correlated with beam location. The image signal is impressed on the electron beam in order to control image size, position or geometry. The variable clock rate is developed from stored instructions.

16 Claims, 8 Drawing Sheets (WITHOUT HORIZONTAL PINCUSHION CORRECTION)

(OUTPUTS FROM GATE ARRAY 26)

| +5 | +4 | +2 | +1 | 0 | 0 | 0 | 0 | 0 | 0 | 0 | -1 | -2 | -4 | -5 |
|----|----|----|----|----|----|----|----|----|----|----|----|----|----|----|
| +5 | +4 | +2 | +1 | 0 | 0 | 0 | 0 | 0 | 0 | 0 | -1 | -2 | -4 | -5 |
| +5 | +4 | +2 | +1 | 0 | 0 | 0 | 0 | 0 | 0 | 0 | -1 | -2 | -4 | -5 |

MAP MEMORY (BLUE)

(RIGHT SIDE OF SCREEN: SEGMENT 80, FIG. 4)

DIRECTION OF ELECTRON BEAM SWEEP

HORIZONTAL MISCONVERGENCE CORRECTION SYSTEM FOR COLOR VIDEO DISPLAY

CROSS-REFERENCE TO RELATED APPLICATION

This application is related to, but in no way dependent upon, application Ser. No. 602,555, filed Oct. 22, 1990, of common ownership herewith.

BACKGROUND OF THE INVENTION

This invention relates generally to cathode ray tubes (CRTs) and is particularly directed to apparatus and method for controlling image size, geometry and/or position. In an in-line color CRT, the invention may also be employed for correcting horizontal convergence.

As used herein, the term "video" is used in a general sense to apply to any CRT image or picture, as might be developed by a computer monitor, television receiver or special purpose CRT display.

The standard gun/yoke system used in most color computer monitors and television entertainment sets of today includes an in-line electron gun in combination with a self-converging yoke. The in-line electron gun has a built-in static convergence mechanism (offset apertures or angled grid faces, etc.), whose function is to converge the outer beams at the center of the phosphor screen. If a uniform yoke field is applied to deflect the beams to the corners of the screen, the point of convergence falls short, resulting in over-convergence of the outer beams. It is the function of the self-converging yoke to apply a quadrupole-like convergence correction field to keep the beams in convergence as they are deflected.

The quadrupole-like correction field has a well-known adverse effect on the focus characteristics (spot size and shape) of all three beams. A microscopic view shows this field applying a horizontal underconverging force and a vertical overconverging force to each beam bundle causing a horizontal underfocusing action and a vertical overfocusing action. The quadrupole-like correction field causes a deflection defocusing beam condition that increases with deflection. When the beam is in the top left corner, it receives the largest amount of beam distortion; such distortion can only be partially corrected.

A color CRT display such as employed in a television receiver is typically constructed as shown in simplified, schematic form in FIG. 1. The CRT 10 includes an evacuated envelope or bulb, containing red (R), green (G) and blue (B) electron guns at one end directing a plurality of electron beams 13 on a display screen or faceplate 16 at the other end of the CRT. The three electron gun cathodes for R, G and B are horizontally arranged in a tube neck portion 11 and the electron beams 13 emitted therefrom are deflected by a uniform field horizontal deflection coil 14 and produce beam spots on the phosphor-coated inner surface of the display screen 16. A static convergence magnet assembly 12 disposed about the tube neck portion 11 applies magnetic fields to the three electron beams 13 to compensate for electron gun misalignment and to insure convergence of the beams when undeflected. Vertical deflection coils (not shown) are also provided for vertically displacing the electron beams during each horizontal sweep. The three electron beams converge on a "surface of perfect convergence" which is approximately spherical and intersects the display screen 16 at a point where the undeflected center (green) electron beam is incident thereon.

The in-line arrangement of the three electron guns and the non-spherical curvature of the CRT's display screen 16 cause the three electron beams to sometimes be incident upon different locations on the display screen as the beams are swept horizontally across the screen. This electron beam misconvergence is greatest adjacent the lateral edge portions of the display screen 16 as shown in FIG. 1. FIG. 2 shows the red (R) electron beam positioned to the left of the green (G) and blue (B) electron beams on the left-hand and right-hand portions of the display screen 16. Adjacent a vertical center line of the display screen 16, the three electron beams are converged near the center of the display screen, with the two outer beams diverging as the upper and lower edges of the display screen 16 are approached. Horizontal electron beam misconvergence becomes even greater in the case of a color CRT having a perfectly flat glass faceplate.

As is clear from FIG. 2, conventional television receivers, if not compensated, have a severe pincushion geometrical distortion due to the fact that the cathodoluminescent screen does not lie on the surface of perfect convergence. The problem is much more severe in color cathode ray tubes of the type having a perfectly flat screen.

Conventional pincushion compensation circuits do a satisfactory job of rectifying pincushion geometrical distortion, however in severe cases such as are presented by the flat screen tube alluded to, conventional pincushion circuits may nevertheless leave a residuum of errors which cannot be eliminated at reasonable cost. Further, other geometrical distortions may occur in images produced by color cathode ray tubes which cannot be readily compensated by circuitry or other means.

Further, conventional cathode ray tubes having self-converging yokes are not readily suited for high resolution monitor applications wherein the scan frequencies may be in the order of 64 kilohertz or greater.

PRIOR ART

Schweer U.S. Pat. No. 4,689,526
Meyer U.S. Pat. No. 4,422,019
Kamata U.S. Pat. No. 4,401,922

OBJECTS OF THE INVENTION

Accordingly, it is an object of the present invention to provide an improved video image on a color CRT by correcting for electron beam horizontal misconvergence.

Another object of the present invention is to reduce off-center convergence distortion in the video image presented on the faceplate of an in-line gun color CRT.

Yet another object of the present invention is to reduce pincushion and other video geometrical distortions in color CRT images.

It is another object of the present invention to provide for electron beam horizontal convergence in a color CRT having parallel electron guns without the need for electrostatic or magnetic beam convergence.

A still further object of the present invention is to eliminate or reduce the need for yoke drive circuitry for pin cushion correction in a color CRT.

Another object of the present invention is to reduce the cost of a color CRT by substantially reducing labor-intensive set-up time by employing inexpensive uniform field magnetic deflection yokes, and by eliminating the requirement to match or fit, the magnetic deflection yoke to the CRT during manufacture.

Yet another object of the present invention is to simplify and reduce the cost of a color CRT by eliminating the requirement for yoke "tilting" during CRT set-up.

It is another object of the present invention to provide for horizontal geometry correction in a raster-scanned video display to reduce pincushion correction requirements.

It is an object of the invention to utilize a color cathode ray tube system with a uniform field yoke in order to obtain the benefits resulting from the elimination of a self-converging yoke. The electron beam spot size is considerably reduced and is much more uniform throughout all areas of the screen. Normal gun rotation errors create no problems due to the fact that different beams experience the same magnetic field strengths during electron beam deflection, which is not the case with systems utilizing a self-converging yoke. Because of the immunity of the electron beams from deflection field defocusing and distortion, the electron guns can be driven harder. Uniform field yokes are much less expensive to manufacture than self-converging yokes.

It is yet another object of this invention to provide a color cathode ray tube system capable of use with a simpler and less expensive electron gun. The gun may have parallel beams which in turn permits manufacture by parallel mandrelling of the parts during assembly, in turn leading to much higher precision in gun manufacture, greater yields and lower manufacturing cost. The shunts and enhancers needed with systems having a self-converging yoke may be eliminated.

It is another object of the invention to provide such a system in which convergence control is independent of gun focus.

It is still another object of this invention to provide a color cathode ray tube system which is readily adapted for use at scan frequencies of 64 kilohertz and above, and thus which does not suffer from the problems associated with high frequency scanning in systems having a self-converging yoke.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 3:
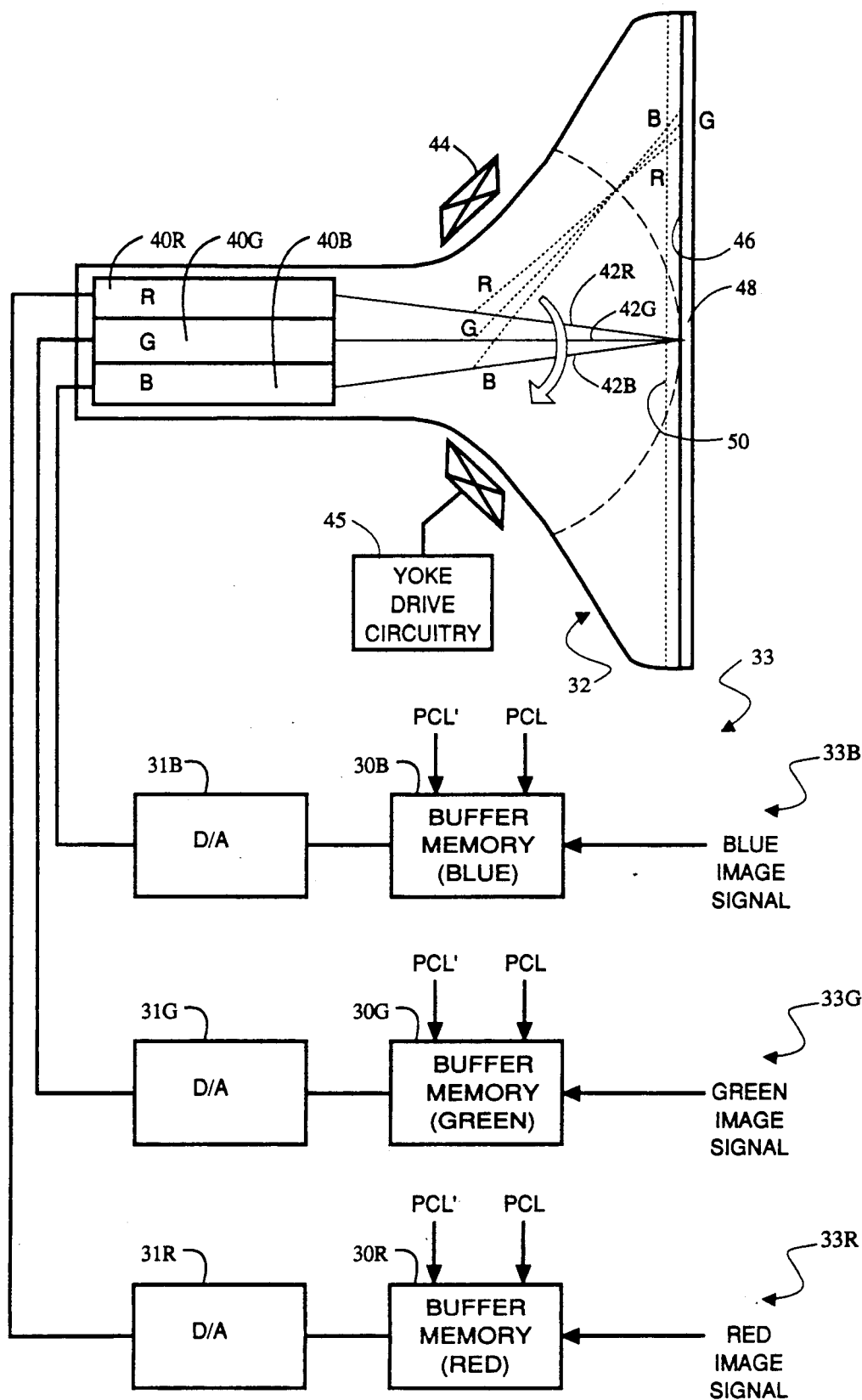
FIG. 3 depicts a color cathode ray tube system employing the present invention.

A description of a preferred embodiment of the invention will now be engaged, particularly adapted for correction of electron beam misconvergence. FIG. 3 illustrates in schematic form an in-line color cathode ray tube system 33 incorporating a system of electronic dynamic horizontal convergence correction following the teachings of the present invention.

The FIG. 3 embodiment is illustrated as comprising a cathode ray tube 32 having an in-line type electron gun structure including guns 40R, 40G and 40B for generating electron beams 42R, 42G and 42B modulated by red image signals, green image signals and blue image signals, respectively. A uniform field yoke 44 with suitable drive circuitry 45 is provided for sweeping the electron beams across a cathodoluminescent screen 46. The cathode ray tube 32 is illustrated as being of a type having a perfectly flat faceplate 48 and a flat tension-type shadow mask 50.

Figure 1:
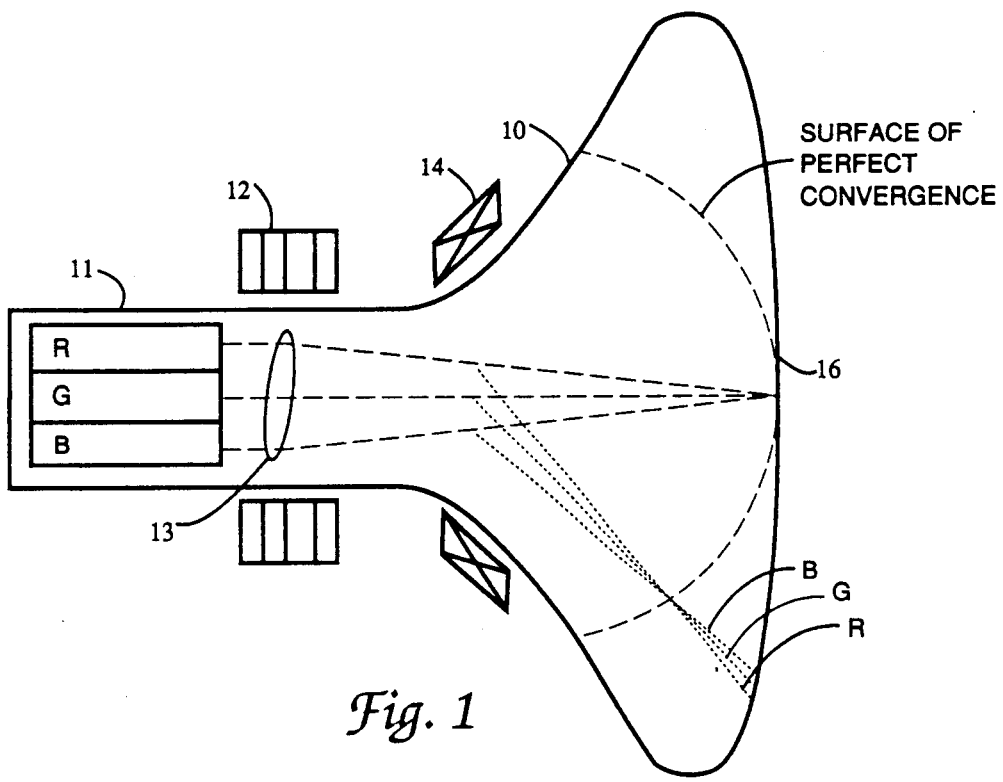
FIG. 1 is a simplified sectional view in schematic diagram form of a convention three-beam, in-line color CRT.

As can be seen from the dotted line (deflected) electron beam representation, a cathode ray tube having a perfectly flat screen 46 will have exacerbated convergence and geometrical distortion errors as compared with the prior art CRT shown in FIG. 1 which has a spherically or bi-radially curved faceplate.

The illustrated FIG. 3 cathode ray tube display system 33 includes buffer memories 30B, 30G and 30R receiving blue, green and red video signals respectively. The output from the memories 30B, 30G and 30R is supplied to digital-to-analog converters 31B, 31G and 31R. The output from the converters 31B, 31G and 31R is delivered to the electron guns 40R, 40G and 40B, respectively. Each of the memories receives clock signals PCL and PCL', the function of which will be described hereinafter.

The function and operation of the FIG. 3 embodiment will be better understood after a description of the means for generating the rate-shifted clock signal PCL'. In this connection, see FIGS. 3A and 3B.

Figure 3A:
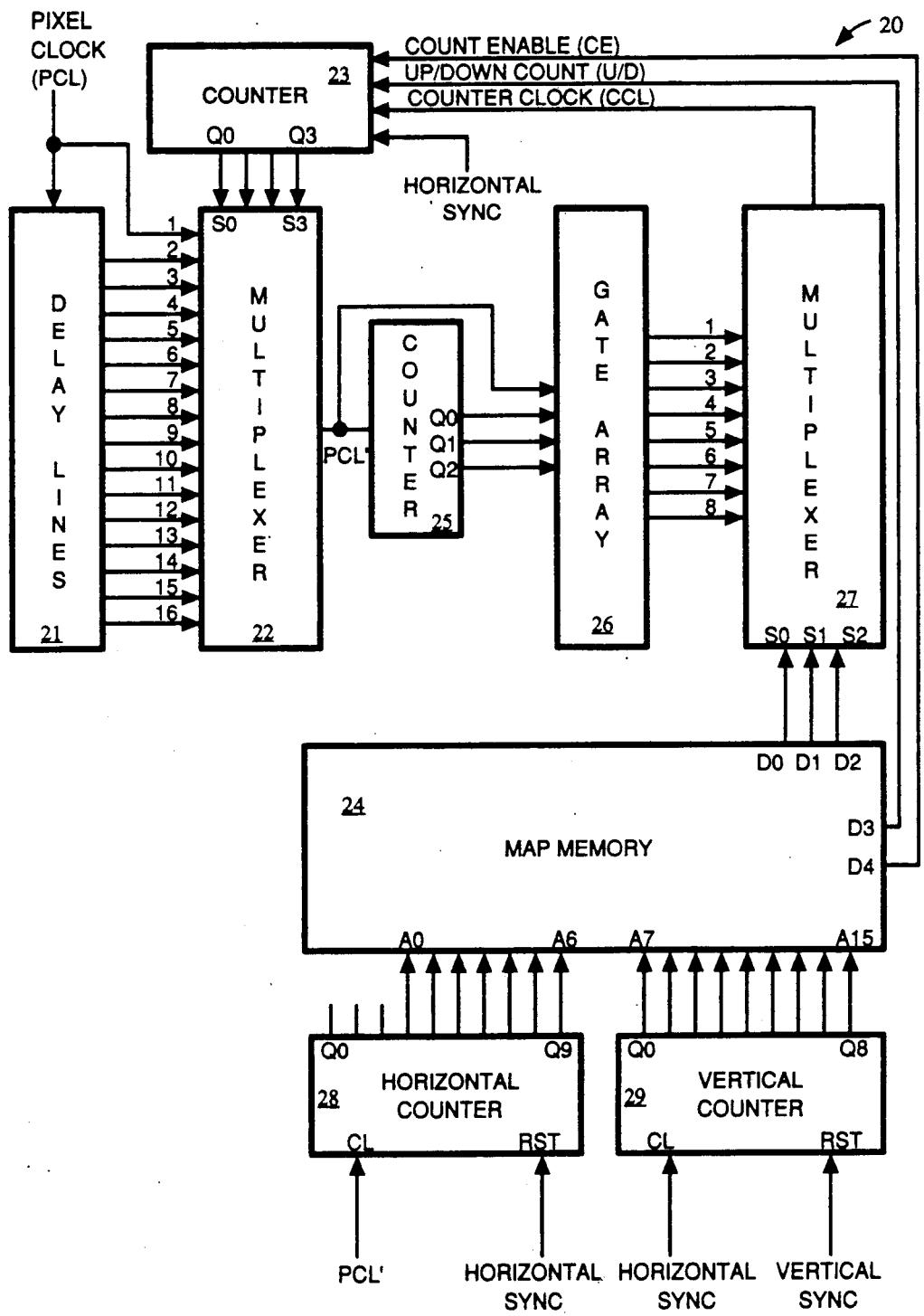
FIG. 3A is a simplified block diagram of an arrangement for deriving a variable clock signal.
Figure 3B:
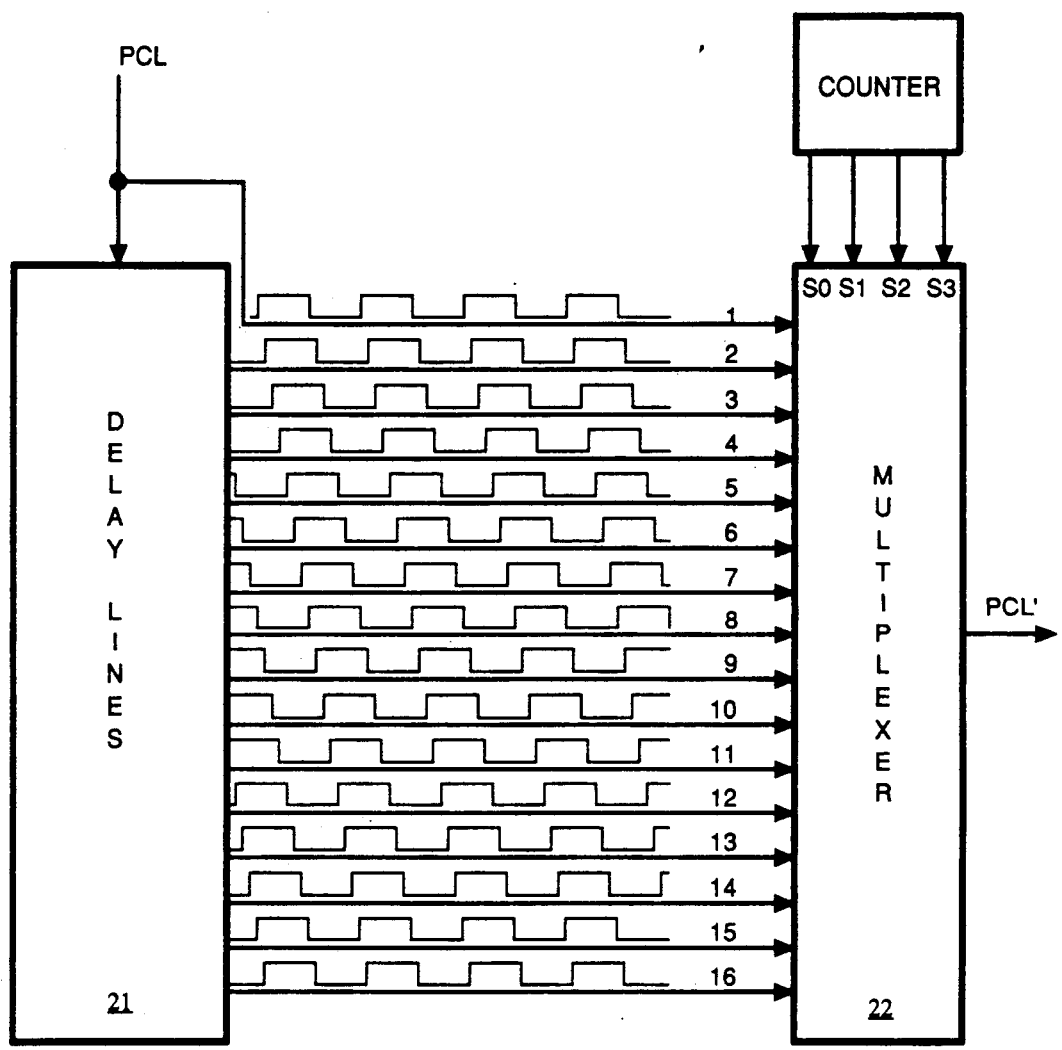
FIG. 3B is a phase diagram for the outputs from multiplexer 22.

In FIG. 3A there is shown in block diagram form a clock signal rate shift generator 20. The rate shift generator 20 includes delay lines 21 coupled to an input line from which an input or pixel clock (PCL) signal is received. The output of delay lines 21 is fifteen progressively phased clock signals appearing on lines numbered 1 to 15. (See FIG. 3B.)

In the illustrated preferred embodiment, a VGA color display is used together with a 4-bit counter 23 (N=4), a 16 input multiplexer 22, and 15 delay lines. Multiplexer 22 samples the outputs from the delay lines 21 to develop an adjusted clock signal PCL' which is selectively greater than, or less than, PCL, as will be explained in detail hereinafter. The PCL period may be 40 nanoseconds, for example. N can be any number equal to or greater than three. By selecting a higher number, the clock period is divided into finer delay intervals, hence making timing control smoother. For display geometry, size and/or convergence correction, N=4 was found to be a suitable number. The rate shifts may be achieved using delay lines comprised of coax cables, L-C networks, or by using the propagation delay of electronic logical gates (TTL, ECL or CMOS).

The first input (1) to the 16 input multiplexer 22 is a non-delayed pixel clock (PCL). The second input (2) to the multiplexer 22 is the same clock signal PCL delayed by one delay line interval. In the same manner, the third input is delayed by two delay line intervals, the fourth by three, and so on, until the last, the 16th input, which is delayed by 15 delay line intervals. Digital code on the select inputs S0 through S3 to the multiplexer 22 select which inputs to the multiplexer 22 are to be sampled. This code is generated at the Q0 through Q3 outputs of counter 23 coupled to the multiplexer 22. Every time counter 23 increments or decrements the count, multiplexer 22 selects the next higher numbered or lower numbered input to be provided to the output. The output from multiplexer 22 is a rate-shifted pixel clock signal (PCL'). When counter 23 increments, a time delay will be subtracted from the period of the time shifted pixel clock signal (PCL'). When counter 23 decrements, a time delay will be added to the clock period. The result of this is to decrease or increase the effective average rate of the adjusted clock signal PCL'.

If, for example, the system is operating at the nominal rate (25 MHz in this example), and taking line 9 as a reference, if the multiplexer is instructed to decrement one line each pixel, the maximum effective rate change, it will successively select, at the nominal 25 MHz pixel clock rate, lines 8, 7, 6, 5 and so on, establishing an effective average clock signal PCL' period of 40 plus 2.5 nanoseconds, or an effective average adjusted clock rate of 23.5 MHz. Similarly, a command to the multiplexer 22 to decrement one line each eighth pixel (the minimum effective rate change) would result in an effective average clock signal period of 40+2.5/8, or an effective average adjusted clock rate of 24.8 MHz. It should be understood that between jumps, the pixel clock rate returns to 25 MHz. Commands to increment one line every fourth pixel would produce an effective average clock period of 40−2.5/2 ns or an effective average adjusted clock rate of 25.8 MHz.

As will be seen, in the illustrated example, instructions to the multiplexer 22 can effect increments or decrements of up to 8 lines in an eight pixel period with a change in the rate of the adjusted pixel clock signal PCL' between a minimum effective average rate of 23.5 MHz and a maximum effective average rate of 26.67 MHz.

Counter 23 has four inputs and four outputs. The first input, counter clock (CCL), receives the pulses generated by a second multiplexer 27. The second input, up/down count (U/D), changes the mode of the counter 23 to either incrementing or decrementing. The third input, count enable (CE), enables or disables the counter 23. The up/down count (U/D) and count enable (CE) signals are data signals received from a convergence map memory 24. A fourth input (RESET) to the counter 23 resets the counter every horizontal sync pulse. The four outputs Q0 through Q3 of the counter 23 select the multiplexer 22 inputs.

The convergence map memory 24 outputs five bits of digital data code. Different types of devices, such as a ROM, a RAM, etc, can be used for convergence correction mapping. Map memory 24 is addressed by horizontal and vertical counters 28 and 29, which update data reading every eight shifted clock signals (PCL'). The first three bits of data outputted by the convergence map memory ($D_0$, $D_1$, $D_2$) determines the extent of rate shifting of the pixel clock (PCL') to be effected. The pixel clock (PCL') rate may be advanced or retarded one increment or decrement or as many as eight, or it may undergo no change, depending on the value of the three bits of data. The fourth bit is the up/down bit, while the fifth bit is the counter enable bit.

Counter 25 is a 3-bit up-counting binary counter for providing three weighted binary outputs to the gate array 26. Gate array 26 is a gate structure which has four inputs and eight outputs. The first input receives the PCL' clock signal. The second input (Q0) receives the PCL' clock signal rate divided by two. The third input (Q1) receives the PCL' clock signal rate divided by four, while the fourth input (Q2) receives the PCL' clock signal rate divided by eight.

Figure 3C:
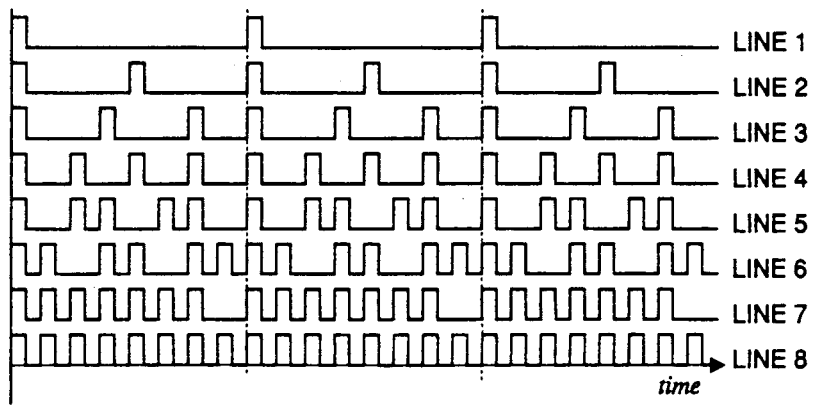
FIG. 3C illustrates the outputs on lines 1-8 of gate array 26.

The resulting eight outputs of this gate array 26 appear on lines 1–8 as follows (see FIG. 3C): the first output on line 1 has just one pixel clock pulse out of eight; the second output (line 2) has two pixel clock pulses out of eight; the third output has three pixel clock pulses out of eight; and so forth, until the last output (line 8) has eight clock pulses out of eight. Gate array 26 serves to space the clock pulses.

The eight-input multiplexer 27 selects one of eight inputs from the gate array 26 by decoding data on the three select lines, S0, S1 and S2, provided from the first three bits of data from the convergence map memory 24.

The horizontal counter 28 addresses the address inputs of the convergence map memory 24. The horizontal counter 28 is a sync binary counter with a MASTER RESET. The number of stages of the horizontal counter 28 depends on the resolution of the display. For VGA color monitors, a ten stage counter is used. The input clock to the horizontal counter 28 is the time shifted pixel clock signal (PCL'), and horizontal sync pulses are used to reset the horizontal counter. The first three outputs of the horizontal counter 28 are not used, in order to increment the convergence map memory 24 location every eight pixel clock pulses.

The vertical counter 29 is the same type of device as the horizontal counter 28. The number of stages of the vertical counter 29 depends on the vertical resolution of the display. For VGA color monitors, nine stages of the vertical counter 29 are used. The input clock to the vertical counter 29 is the horizontal sync pulse and the reset signal is the vertical sync pulse. All nine outputs are provided to the convergence map memory 24.

Memories 30B, 30G, 30R are buffers which permit writing video information into memory at the video generated pixel clock (PCL) rate, and clocking out (reading) information stored in memory at the newly generated (time shifted) pixel clock (PCL') rate derived from the clock signal shift generator 20.

Various types of memory devices can be used to carry out this portion of the invention. One approach would be to use two toggled RAM video HORIZ memories. The two RAM memories could be alternated between WRITE and READ modes every horizontal line. For example, when memory 1 is in the READ mode, memory 2 would be in the WRITE mode. At the next horizontal line, memory 1 would be in the WRITE mode while memory 2 would be in the READ mode. The memory 30 must be at least 1K in size to be VGA compatible.

The preferred approach uses a FIFO (first in, first out) type of memory. This approach is more economical, because just one memory chip is needed to do one line of buffering. A 32 or 64 bit FIFO memory is adequate. In addition, this memory need not be as deep as RAM memory. A FIFO memory has independent asynchronous data inputs and outputs, permitting the WRITE clock (PCL) to READ clock (PCL') to be asynchronous and independent of one another.

The width of the memory depends on the color resolution of the monitor. For a VGA display, a seven to eight bit wide memory is needed. The digital-to-analog converter 31 is used to convert digital video to the standard analog video signal. The CRT 32 having a video amplifier (not shown) receives the analog video signal from the D/A converter 31 and displays the video signal on its screen.

Returning to a description of the FIG. 3 system, as will be described in detail hereinafter, the clock signal shift generator 20 provides variable average rate clock pulses to the raster scanned video display system 33 to control the delivery rate of red, blue and green video signals. Those signals control the three electron guns as their respective beams sweep the CRT faceplate to correct errors in image position, size, and geometry.

Figures 4, 5A:
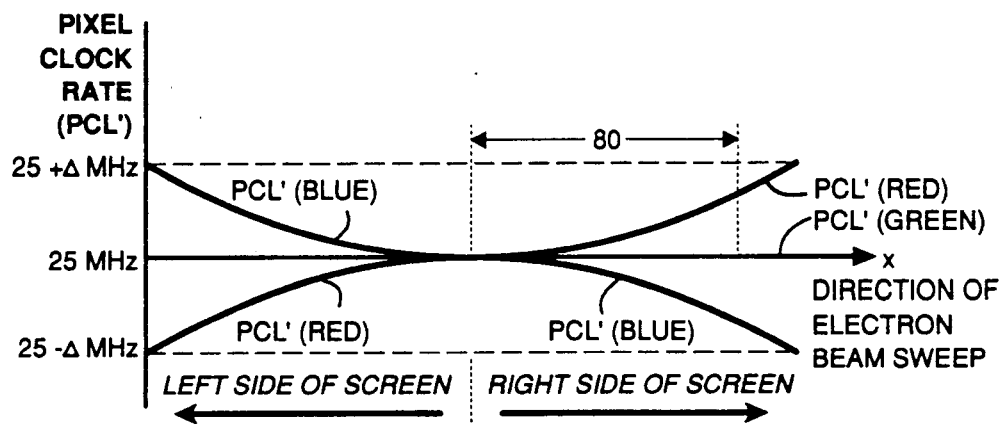
FIG. 4 is a graphic illustration of the variations of effective average pixel clock signal PCL' for controlling the signal delivery rate of each of the red, blue and green image signals in a color CRT in accordance with the present invention.
FIG. 5A is a schematic representation of blue image clock rate signal data stored in a map memory constituting part of the system of the invention.

Referring to FIG. 4, there is shown in graphic form the manner in which the pixel clock signal rate is adjusted to correct for electron beam misconvergence as the three electron beams are swept across the center of the CRT's faceplate. In FIG. 4, which corresponds to a trace of the beams across the screen center (see 62 in FIG. 2), the change in the pixel clock relative to a nominal pixel clock frequency of 25 MHz (VGA compatible) is shown with the position of the electron beams as they are swept horizontally across the CRT's faceplate in an "X" direction. Thus, with reference also to FIG. 2, as the electron beams are swept from left to right, on the left-hand portion of the display screen 16 the red image signal will be clocked out of memory 30R at an initially slower rate than the green image signal. Similarly, the blue image signal will be clocked out at an initially faster rate than the green image signal.

The red image signal is clocked out of memory 30R at a pixel clock rate of 25 minus delta MHz and is increasing, and the blue image signal is clocked out of memory 30B at 25 plus delta MHz and is decreasing, where the green image signal is clocked out at a constant 25 MHz. Delta represents the maximum rate shift in signal clockout. Similarly, on the right-hand portion of the display screen, the pixel clock signal of the red image signal is increased further from the center outward to an effective average a frequency greater than 25 MHz, while the blue pixel clock signal is reduced further to an effective average frequency less than 25 MHz. Thus the rate of the blue image signal is decreased on the left and right side portion of the CRT's display screen relative to the rate of the green image signal. A converse clock signal rate shift is applied to the red image signal. The pixel clock rate of the green image signal is shown as maintained at approximately 25 MHz throughout horizontal sweep of the green electron beam. By this controlled delivery of the red, blue and green video image signals, the red, blue and green information associated with a given pixel is presented to the pixel in spatial coincidence despite the time separation of the image signals.

At the initiation of the sweep of the three beams across the screen center, the red beam spot leads the green beam spot, which in turn leads the blue beam spot as they travel across the cathodoluminescent screen 46. Thus an initial delay must be introduced between the beams. This is accomplished by making appropriate fixed time delay shifts in the FIFO memories 30B, 30G, 30R for the blue image signals, green image signals and red image signals (see FIG. 3A). In other words, the red image, blue image and green image signals are loaded into the respective memories 30R, 30B, 30G at different relative memory positions such that when clocked out they have the proper relative initial (start) timing.

It will also be understood that the initial effective average clock rate PCL' for the red image signal at the left side of the screen is at minimum rate of 25 minus delta MHz and for the blue image signal is at a maximum rate of 25 plus delta MHz.

The necessary shifting of the respective delivery rates of the red, blue and green image signals is substantially the same for scans through off-center portions of the screen.

It will be understood from the above discussion that the 5 bits of data stored in the memory map at the various address locations, described above as corresponding to every eighth pixel, contains one bit of information indicating whether the change in signal delivery rate should be increased or decreased, an enable bit, and three bits indicating the magnitude of the signal rate change.

FIG. 5A is a simplistic representation of data which might be stored at certain points in the map memory 24 for the clock rate for the blue image signal. An ideal condition is represented, wherein no variance in the vertical direction is experienced. Data corresponding to a sweep of the blue beam across the screen from left to right starts out by indicating that the clock rate should be at a fast rate relative to the nominal rate (25 MHz in this example), in an eight pixel period. It will be seen that the data stored in the memory will cause the blue image signal effective average clock rate to decrease in ever smaller decrements until at a point near the screen center the effective adjusted clock rate PCL' is substantially unchanging. As the beam passes through screen center, the data stored in the map memory for the blue image signal will cause the adjusted clock rate PCL' to continue to decrease at an ever faster rate. This will be described in more detail below.

A corresponding diagram for the map memory for the clock rate for the red image signal would show the stored data identical to the clock rate for the blue image signal, but of opposite sign.

There is no need for a map memory for the clock rate for the green image signal since the clock rate is unchanging at all points on the screen.

Figure 5B:
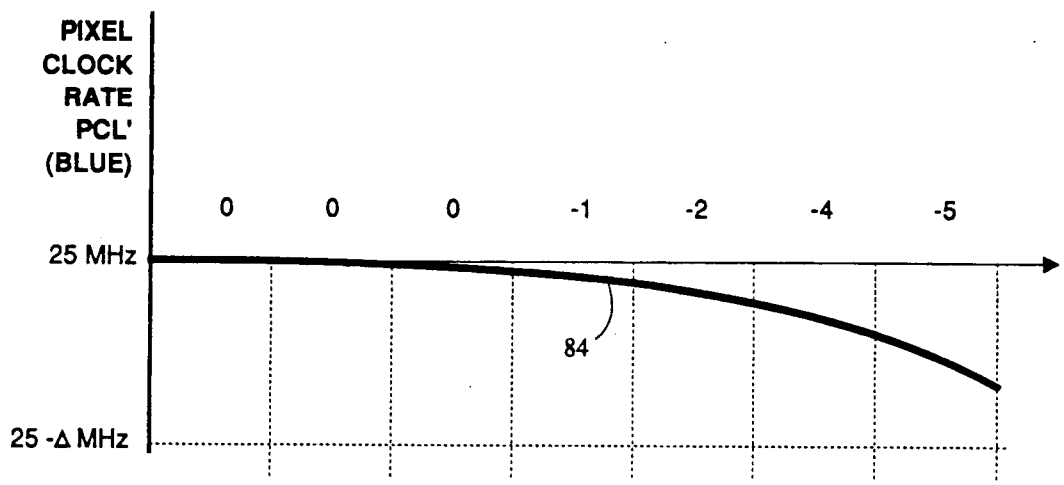
FIG. 5B is an enlargement of a portion of a curve depicted in FIG. 4.
Figure 5C:
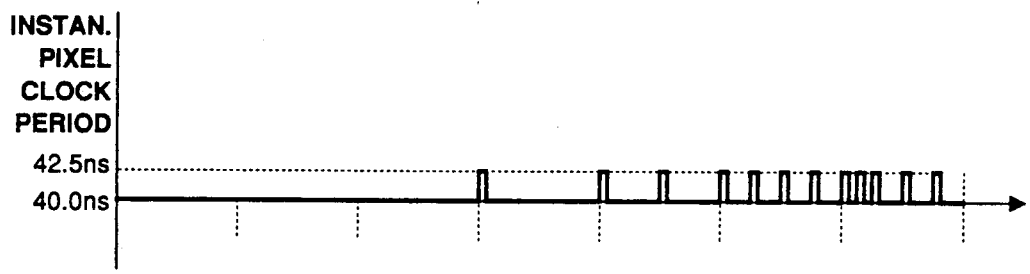
FIGS. 5C and 5D depict instantaneous effective pixel clock period and rate underlying the FIG. 5B curve.
Figure 5D:
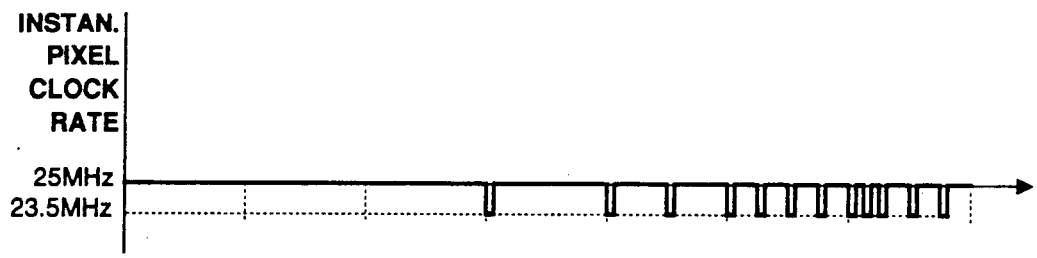

The operation of the variable clock rate generator and the manner in which it produces variable rate clock pulses in accordance with instructions stored in map memory 24 will be better understood by reference to FIGS. 3A-3C and 5A-5D. FIG. 5B is an enlargement of a segment 80 of the effective average pixel clock signal 84 for the blue image represented in FIG. 4. As shown in FIG. 5C, on an instantaneous basis, the effective clock period jumps between 40 ns and 42.5 ns in accordance with the pulses delivered to multiplexer 22. The corresponding change in instantaneous effective adjusted clock rate is shown in FIG. 5D.

In this illustrative example, which is simplified for ease of explanation, the number of changes in the pixel clock signal PCL' for the blue image signal is shown as consisting of only a half dozen or so changes. In practice, as indicated above, the map memory would contain information indicating a change in the pixel clock rate every few pixels, for example, eight. The information retrieved at every eighth pixel location would be acted on over the next eight pixels, as the system awaits its next instruction.

At the center of the screen the blue image signal is being clocked out of memory 30B at the nominal rate (25 MHz in this example) and is unchanging, as can be seen from the map memory for the blue image signal (FIG. 5A). As the blue beam sweeps off center, the effective average clock rate for the blue image signal is caused to decrease at an increasing rate. This is clear from the instructions stored in the blue image signal memory 30B which shows the effective average clock period incrementing first by one increment per eight pixel period, then by two, then by four and finally by five increments.

Returning to the example under discussion, it is seen from FIGS. 5B-5D that the first three eight pixel segments have no change from the nominal 25 MHz rate, indicated by the zero value stored in the map memory 30B.

However, to cause a decrease in the pixel clock rate PCL' for the blue image signal, as stated, the pixel clock period is caused to increment one unit in an eight pixel count, then two units in the next eight pixel count, then four units and finally five units in the last eight pixel span. The system which causes this change in the pixel clock rate to happen as follows.

Instructions stored in the map memory 24 are outputted on lines D0-D5, as described above. For the instruction "−1", a single pulse is outputted on line 1 (see FIG. 3C) in the experienced eight pixel period which causes a single pulse (per eight pixels) to be fed to the counter 23, in turn causing the multiplexer 22 to select the next lower-numbered (shorter delay) delay line, adding (in the present example) 2.5 nanoseconds to the clock period of one of the ensuing eight pixel counts and thus effectively slowing down the effective average pixel clock rate to 24.8 MHz. (It can be understood from FIG. 3B that selecting a delay line having a shorter delay of the pixel clock signal PCL results in a longer adjusted pixel clock period and thus a slower effective average rate adjusted pixel clock signal PCL'.)

Following the instructions from the map memory 24, the multiplexer 22 is then instructed via multiplexer 27 to make two jumps within an eight pixel period, with the result that the effective average period of the blue pixel clock signal lengthens to 40+2.5/4. Selection of output line 2 from gate array 26 results in two pulses within an eight pixel period being delivered to multiplexer 22, with the result that two spaced increments in the pixel clock period occur (two upward jumps on the delay lines 21). As can be seen by a comparison of FIGS. 3C and 5B-5D, the change in the effective average pixel clock rate follows the spacing of the pulses delivered on the selected output lines from gate array 26, and the corresponding changes in instantaneous clock rate (FIGS. 5C and 5D).

By the storing of appropriate instructions in the map memory 24, and by utilizing fine enough steps (eight in this example), the desired adjusted effective average pixel clock signal 84 for the blue image signal can be approximated as closely as desired. It can be seen that up to eight stepwise changes in the pixel clock rate can be made in an eight pixel period, giving a maximum change of one rate change per pixel.

One may think of the variable clock signal generator as a commutator which turns in one direction or the other at a speed determined by the number of pulses received in a given time period by counter 23, the counter, in turn being under control of instructions stored in map memory 24.

There has thus been shown a clock signal generator which is particularly adapted for use in a memory mapped horizontal video display system with an in-line color CRT for correcting for electron beam misconvergence in the horizontal direction. Red, blue and green image signal delivery rate information is stored in a convergence map memory for recall and use in reading data from a video memory in controlling the clock-out rate of the image signals.

The embodiment described above utilizes a color CRT display system in which the electron guns are statically converged at the center of the screen. As suggested above, the invention is also adaptable for use with an electron gun system in which the electron guns do not generate beams which are statically converged, but instead generate electron beams which are parallel or partially converged throughout their trajectory. Convergence is accomplished electronically in accordance with the teachings of this invention.

As suggested above, a system having a parallel beam electron gun has a number of significant advantages over systems in which the electron beams are statically converged. The gun can be manufactured using parallel mandrels to assemble the parts, resulting in higher precision, greater yields and lower manufacturing costs.

Figure 6:
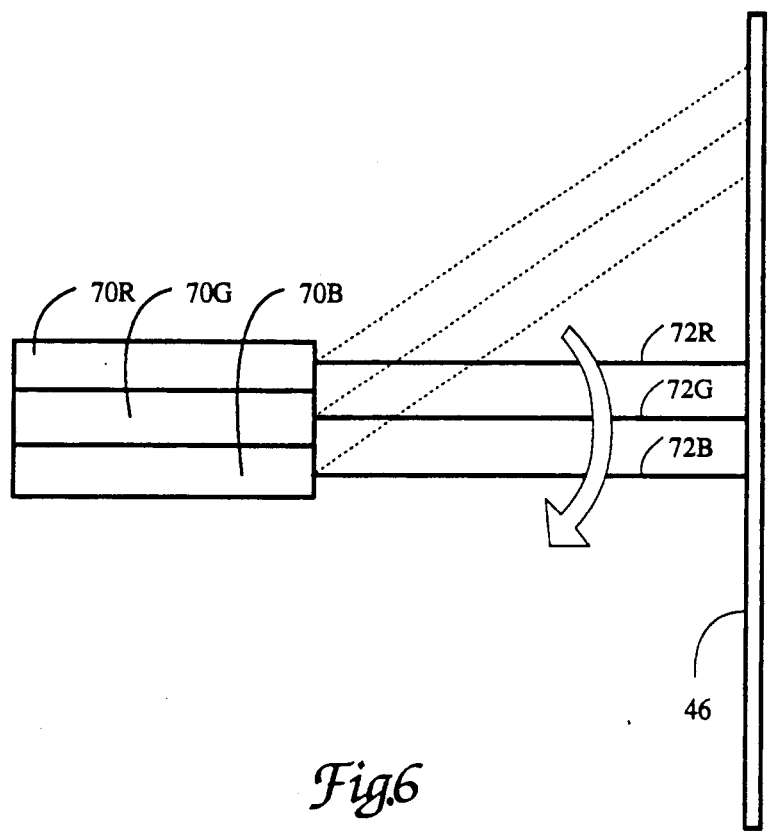
FIG. 6 depicts a parallel beam electron gun useful in an alternate embodiment of the invention.
Figure 7:
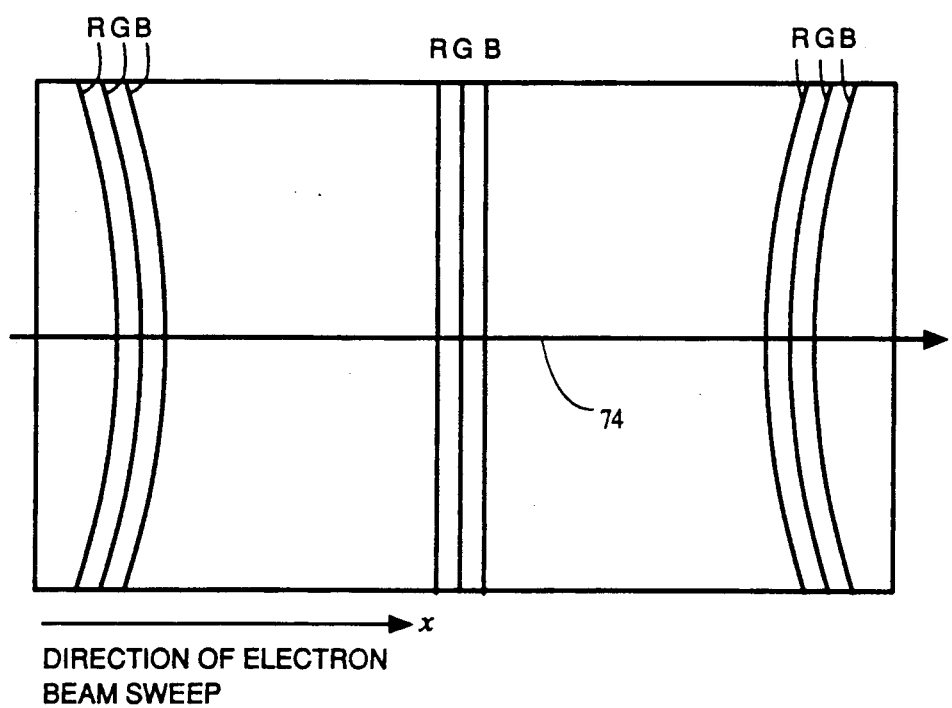
FIG. 7 is a diagram corresponding to FIG. 2 for a system having a parallel beam gun.

A parallel beam system according to this invention may be similar to the FIG. 3 system except that the electron guns 70R, 70G and 70B emit beams 72R, 72G and 72B which are parallel rather than statically converged at the screen 46 (see FIG. 6). The horizontal misconvergence which could occur without the practice of this invention is illustrated in FIG. 7. By selecting an appropriate initial delay between the initiation of the blue, green and red image signals, the information associated with a single pixel can be delivered in a time sequenced, but spatially coincident, relationship to effect an electronic convergence of the red, blue and green component images at all points on the screen. As described above, the required inter-signal delays can be achieved by appropriate fixed time delay shifting of the image signals stored in memories 30R, 30G and 30B.

This can be accomplished, as described above, by preloading memories 30R, 30B, 30G such that when clocked out they have the proper relative timing.

Each of the above-described embodiments is adapted for electronic correction of misconvergence or control of image position for any reason. The principles of the present invention are equally adaptable to correction of horizontal size or geometric distortions in CRT images—either monochrome or color. The techniques described above have dealt with the problem of bringing into coincidence on a CRT screen component images which are spatially separated as a result of separation of the beam landing spots which define their respective red, blue and green component images on the CRT screen. Such separation may be as a result of under-convergence or over-convergence of the beams in a system in which the screen does not lie on the aforedescribed surface of perfect convergence. As noted the problem is especially severe in CRTs having faceplates which are perfectly flat. The situation of spatial separation of the component images may also occur where the beam spots defining the component images are deliberately caused to be spatially separated, as in a system, as described, having parallel electron beams.

On the other hand, the correction of geometrical distortions in CRT images does not involve multiple component images—each component image in a color CRT would have substantially the same distortion and would be corrected in the same way.

Figure 2:
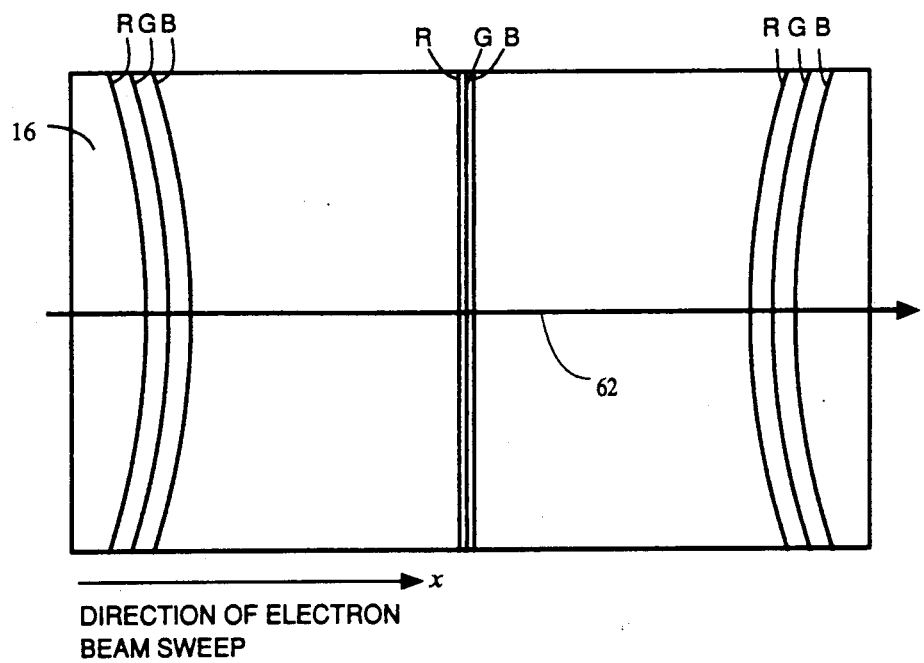
FIG. 2 is a view of the display screen of a color CRT with a uniform field yoke, illustrating a condition of severe misconvergence of the CRT's three electron beams and pincushion distortion of the red, blue and green component images.

In the FIG. 2 illustration, the red, blue and green component images each exhibit what is known as pincushion distortion—a particularly severe geometrical distortion in CRT images which results from the fact that the cathodoluminescent screen does not lie on the surface of perfect convergence. The electron beam as it sweeps to the edge of the screen, particularly in the corners, flares out away from the center with the error increasing with radial distance from the screen center.

In a color CRT of the flat tension mask type a depicted schematically in FIG. 3, it may be desirable to use conventional pincushion circuitry to eliminate most of the pincushion geometrical distortion. However, it is very difficult at reasonable cost to eliminate all geometrical distortion. A residual distortion typically remains after conventional pincushion compensation circuits have eliminated the bulk of the geometrical distortion. Such an error pattern may take the form shown in FIG. 8 wherein vertical lines intermediate the center and edges of the screen may have a bowed shape (shown exaggerated in FIG. 9—see lines 90 and 92).

Figure 8:
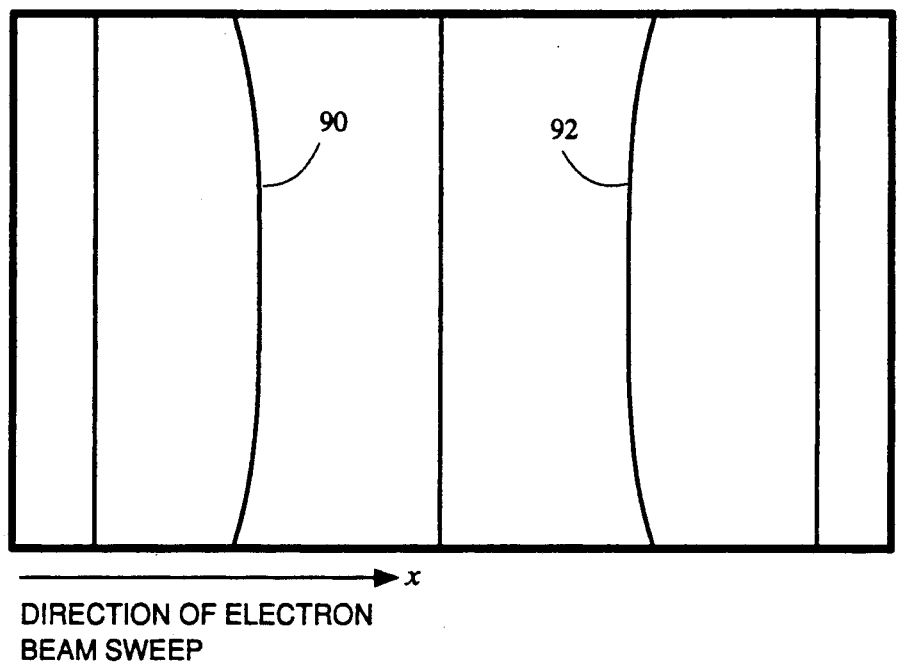
FIG. 8 is a diagram of a display screen showing the effect of a flat-faced CRT system corrected for pincushion distortion but with a residuum of geometrical errors.

Pincushion distortion and other distortions such as the residual distortion illustrated in FIG. 8 can be corrected using the principles of the present invention. To correct pincushion distortion as illustrated in FIG. 2, for example, a system as described above in FIGS. 3 and 3A may be employed. The geometrical distortion can be corrected by selectively controlling in a like way the pixel clock rate PCL' for each of the red, blue and green image signals. For a trace through the center of the screen 62 in FIG. 2 a variation in the pixel clock rate PCL' for each beam might take the form depicted in FIG. 9 at 94 wherein at the left edge of the screen the pixel clock rate PCL' starts at 25 minus delta MHz and increases through the nominal 25 MHz rate to a maximum at the screen center of 25 plus delta MHz, then falling back to 25 minus delta MHz at the right side of the screen. The clock pulses would be clocked out asynchronously from the memory 30, the curve 94 being such that the horizontal sweep time is the same for all horizontal scansions which define the complete image.

Figure 9:
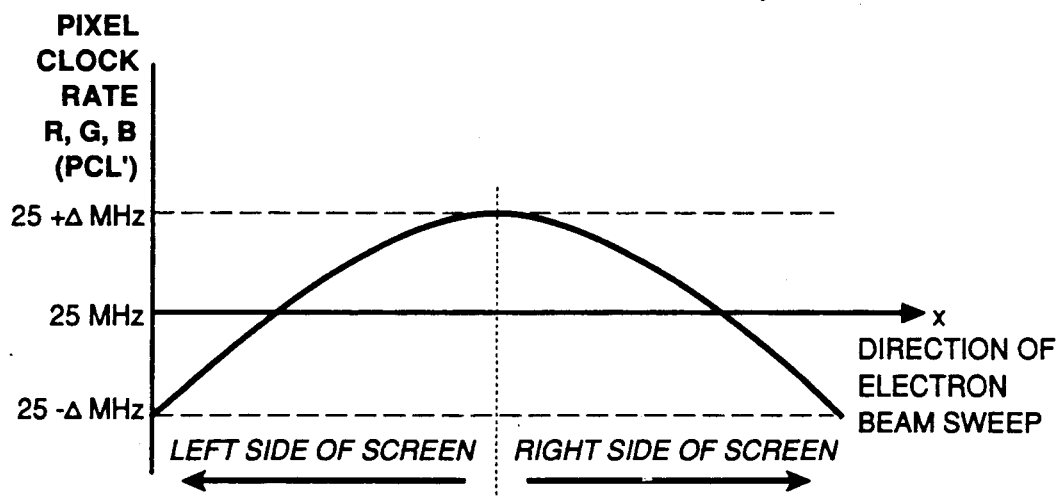
FIG. 9 is a curve of PCL'-verses horizontal scan suitable for correcting pincushion distortion, for a beam trace through the screen center.

For a scan across the top of the screen the pixel clock rate PCL' for each of the red, blue and green image signals would have the same general configuration as curve 94 in FIG. 9, but would be more exaggerated due to the greater correction needed in that region of the screen.

The present invention may be employed to simultaneously correct horizontal convergence, size and geometrical distortion errors. To determine the net corrections needed in pixel clock rate PCL' for each of the red, blue and green image signals at any point on the screen, the map memory data need be merely added arithmetically. For example, if at a particular point on the screen the pixel clock rate PCL' for the blue image requires a six unit increment for convergence error correction and a four unit decrement for pincushion correction, the map memory address for that location on the screen would have a stored value of plus two (the arithmetic difference between the correction values for convergence and geometric distortion).

It should be understood that the principles of the invention are applicable not only for full correction of misconvergence errors, but for partial convergence corrections. It is contemplated that a yoke may be employed which has some self convergence. The balance, or some part of the balance, could be compensated by use of the present invention. The invention is also useful in systems in which a portion of the necessary convergence correction is accomplished in the gun system, and the balance accomplished using the present invention. Still other methods are known for achieving dynamic beam convergence. The present invention, thus, may be employed along with such other known techniques, used individually or in combination, to achieve a portion of the necessary correction. Similarly, as alluded to above, for geometrical image distortion correction, circuit means may be employed which operate on the yoke drive currents or employ other techniques for achieving a portion of the necessary geometrical distortion corrections, the present invention being employed to achieve the balance.

The invention may be employed also to control image size, as well as its position and/or geometry.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a color video display system having a color cathode ray tube with electron gun means which projects three horizontally in-line electron beams toward a cathodoluminescent screen, the method comprising:

developing a red image signal, a blue image signal and a green image signal and supplying said signals to said gun means;

sweeping said beams horizontally as a group across said screen to form a color image raster composed of red, blue, and green component images which may be undesirably non-coincident;

controlling the respective rates of supply of said red, blue and green image signals to said gun means such as to reduce or eliminate any such non-coincidence, said controlling including generating a map memory of the cathode ray tube screen in which values stored in memory locations for each of said red, blue and green image signals determine the signal delivery rate at uniquely associated screen locations; and utilizing said map memory to control said rate of supply of said red, blue and green image signals to said gun means.

2. The method defined by claim 1 including storing by lines said red, blue and green image signals in a signal memory means, and wherein said controlling of said rates of supply of said red, blue and green image signals is accomplished by controlled clocking of said signals out of said signal memory means.

3. The method defined by claim 1 for horizontal convergence correction, wherein said electron beams are converged at the screen center, and wherein said controlling of said rates of supply comprises causing, as said beams are swept across one side of said screen, a varying decrease in the delivery rate of a first of said signals with respect to a second of said signals, and a varying increase in the delivery rate of the third of said signals relative to said second signal.

4. The method of claim 1 for horizontal convergence correction wherein said electron beams are parallel and wherein said controlling includes introducing a predetermined fixed average nominal delay between adjacent beams.

5. In a color video display system having a color cathode ray tube with electron gun means which projects three horizontally in-line electron beams toward a cathodoluminescent screen, a method for electronic dynamic horizontal convergence of said beams, comprising:

developing a red image signal, a blue image signal and a green image signal for controlling said beams and storing said red, blue and green image signals in signal memory means;

horizontally sweeping said beams as a group across said screen to form an image raster composed of red, blue and green component images which may be undesirably non-coincident;

generating a map memory of the cathode ray tube screen in which values stored in memory locations determine the rate of supply of said red, blue and green image signals to said gun means; and responsive to said values stored in said memory locations in said map memory, clocking said signals out of said signal memory means at different varying rates and delivering them to said gun means with a relative timing and respective clock rate which is effective to reduce or eliminate any such non-coincidence.

6. The method defined by claim 5 including causing, as said beams are swept across one side of said screen, a varying decrease in the clock rate of a first of said signals with respect to a second of said signals, and a varying increase in the clock rate of the third of said signals relative to said second signal.

7. The method of claim 5 wherein said electron beams are parallel and wherein said method includes introducing a predetermined fixed nominal delay between adjacent beams and adjusting the respective clock rates of said red, blue and green image signals.

8. For use in a three-beam, in-line color cathode ray tube display system, a method for electronically dynamically reducing or eliminating non-coincidence of red, blue and green component images in off-center screen regions due to beam horizontal misconvergence, comprising adjusting the respective delivery rates of red, blue and green image signals controlling said three beams as a function of beam position such that red, blue and green component images in said regions experience a predetermined partial or full convergence, said method including generating a map memory of the cathode ray tube screen pixels in which values are stored in memory locations for each of said red, blue and green image signals determine the signal delivery rate at uniquely associated screen locations of said beams in order to achieve said convergence of said images; and utilizing said map memory to control the relative delivery rate of said red, blue and green signals.

9. The method defined by claim 8 wherein said adjusting of the delivery rates of said signals comprises causing, as said beams are swept across one side of said screen, a varying decrease in the delivery rate of a first of said signals with respect to a second of said signals, and a varying increase in the delivery rate of the third of said signals relative to said second signal.

10. The method defined by claim 8 including storing by lines said red, blue and green signals in respective signal memory, and wherein said adjusting of the delivery rate of said red, blue and green signals is accomplished by clocking said signals out of said signal memory with an appropriate relative rate.

11. The method defined by claim 10 including generating a map memory of cathode ray tube screen locations wherein values stored in memory locations for each of said red, blue and green image signals determine the signal delivery rate at uniquely associated screen locations to achieve said convergence; and utilizing said map memory to provide said relative increase or decrease of said delivery rate of said red, blue and green image signals.

12. For use in a three-beam, in-line color cathode ray tube display system having a perfectly flat cathodoluminescent screen, a method for electronically dynamically reducing or eliminating non-coincidence of red, blue and green component images in off-center screen regions due to beam misconvergence, comprising:

storing by lines in a signal memory red, blue and green image signals controlling said beams;

generating a map memory of the cathode ray tube screen in which values stored in memory locations for each of said red, blue and green image signals determine the signal delivery rates at uniquely associated screen locations of said beams in order to achieve predetermined full or partial convergence of said images; and responsive to values stored in said memory locations in said map memory, retrieving said signals from said signal memory with a respective rate which is effective to cause red, blue and green component images in said regions to experience predetermined partial or full convergence.

13. In a color video display system having a color cathode ray tube with electron gun means which projects three horizontally in-line electron beams toward a cathodoluminescent screen, the method comprising:

developing a red image signal, a blue image signal and a green image signal and supplying said signals to said gun means;

sweeping said beams horizontally as a group across said screen to form a color image raster composed of red, blue and green component images which may be undesirably non-coincident or distorted in geometry; and said supplying of said red, blue and green image signals to said gun means being in accordance with a varying clock signal CL' effective to reduce or eliminate any such non-coincidence or geometrical distortion;

said varying clock signal CL' being developed by:

generating in delay lines a plurality of progressively phased clock signals corresponding to an input clock signal CL delayed by a progression of fixed delay intervals;

developing a control signal identifying desired changes in said input clock signal CL;

responsive to said control signal and to said progressively phased signals from said delay lines, developing said time-varying output clock signal CL' which varies in accordance with said control signal.

14. In a color video display system having a color cathode ray tube with electron gun means which projects three horizontally in-line electron beams toward a cathodoluminescent screen, the method comprising:

developing a red image signal, a blue image signal and a green image signal and supplying said signals to said gun means;

sweeping said beams horizontally as a group across said screen to form a color image raster composed of red, blue and green component images which may be undesirably non-coincident or distorted in geometry; and supplying said red, blue and green image signals to said gun means in accordance with a varying clock signal CL' to reduce or eliminate any such non-coincidence or geometrical distortion;

said clock signal CL' being developed by:
providing an input clock signal;
progressively delaying said input clock signal to provide in parallel a succession of incrementally phased clock signals;
selectively sampling said incrementally phased clock signals in accordance with a control signal to develop a time-varying clock signal CL' whose rate at any instant is determined by said control signal; and
utilizing said clock signal CL' to control the rate of supply of said red, blue and green image signals.

15. In a color video display system having a color cathode ray tube with electron gun means which projects three horizontally in-line electron beams toward a cathodoluminescent screen, the method comprising:

developing a red image signal, a blue image signal and a green image signal and supplying said signals to said gun means;

storing by lines in a signal memory said red, blue and green image signals;

sweeping said beams horizontally as a group across said screen to form a color image raster composed of red, blue and green component images which may be undesirably non-coincident or distorted in geometry; and said supplying of said red, blue and green image signals to said gun means being in accordance with a varying clock signal CL' effective to reduce or eliminate any such non-coincidence or geometrical distortion;

said clock signal CL' being developed by:
providing an input clock signal;
progressively delaying said input clock signal to provide in parallel a succession of incrementally phased delay line clock signals;
selectively sampling said incrementally phased delay line clock signals in accordance with a series of stored instructions to develop a time varying clock signal CL' whose rate at any instant is determined by said stored instructions; and
utilizing said clock signal CL' to control the rate of supply of said red, blue and green image signals,
said time varying clock signal CL' being used to retrieve said stored instructions, whereby delivery of said image signal is synchronous with the retrievel of said stored instructions.

16. In a color video display system having a color cathode ray tube with electron gun means which projects toward a cathodoluminescent screen parallel, i.e. statically non-converged, horizontally in-line leading, intermediate and trailing electron beams, a method for electronic dynamic horizontal convergence of said beams, comprising:

developing a first color image signal, a second color image signal and a third color image signal for respectively controlling said leading, intermediate and trailing beams;

storing said signals in signal memory means;

horizontally sweeping said beams as a group across said screen to form a potentially non-converged image raster composed of first, second or third color images;

generating a map memory of the cathode ray tube screen in which values stored in memory locations determine the rate of supply of said first, second and third color image signals to said gun means and which introduce a first delay between said first and second color image signals and a second greater delay between said first and said third color image signals; and responsive to said values stored in said memory locations in said map memory, clocking said signals out of said signal memory with said different delays and at different varying rates effective to achieve horizontal convergence of said images.

* * * * *